US009894583B2

(12) United States Patent
Balan et al.

(10) Patent No.: US 9,894,583 B2
(45) Date of Patent: Feb. 13, 2018

(54) TRAFFIC STEERING AT HANDOVER

(71) Applicant: NOKIA SOLUTIONS AND NETWORKS OY, Espoo (FI)

(72) Inventors: Irina-Mihaela Balan, Munich (DE); Hanns Juergen Schwarzbauer, Gröbenzell (DE); Richard Waldhauser, Munich (DE); Woonhee Hwang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/127,470

(22) PCT Filed: Mar. 20, 2014

(86) PCT No.: PCT/EP2014/055610
§ 371 (c)(1),
(2) Date: Sep. 20, 2016

(87) PCT Pub. No.: WO2015/139753
PCT Pub. Date: Sep. 24, 2015

(65) Prior Publication Data
US 2017/0156095 A1 Jun. 1, 2017

(51) Int. Cl.
*H04W 36/00* (2009.01)
*H04W 36/22* (2009.01)
*H04W 28/08* (2009.01)
*H04W 28/02* (2009.01)

(52) U.S. Cl.
CPC ....... *H04W 36/22* (2013.01); *H04W 28/0236* (2013.01); *H04W 28/08* (2013.01); *H04W 36/0072* (2013.01)

(58) Field of Classification Search
CPC ............ H04W 28/0236; H04W 28/08; H04W 36/0072; H04W 36/22
USPC ......................................... 455/439
See application file for complete search history.

(56) References Cited

U.S. PATENT DOCUMENTS

| 2014/0341187 | A1* | 11/2014 | Lei | ............... | H04W 76/022 |
| | | | | | 370/331 |
| 2015/0065133 | A1* | 3/2015 | Cui | ............... | H04W 36/22 |
| | | | | | 455/436 |
| 2015/0103755 | A1* | 4/2015 | Cui | ............... | H04W 48/20 |
| | | | | | 370/329 |

(Continued)

FOREIGN PATENT DOCUMENTS

| WO | WO 2013/050070 | * 10/2011 |
| WO | WO 2013/091236 A1 | 6/2013 |
| WO | WO 2013/116984 A1 | 8/2013 |

(Continued)

OTHER PUBLICATIONS

International Search Report dated Nov. 20, 2014 corresponding to International Patent Application No. PCT/EP2014/055610.

*Primary Examiner* — Timothy Pham
(74) *Attorney, Agent, or Firm* — Squire Patton Boggs (US) LLP

(57) ABSTRACT

A method and apparatus are provided. A user equipment is supported at a first access node. The first access node receives an indication of an offload status from a second access node and makes a determination relating to the handover of the user equipment from the first access node to the second access in dependence on the received indication.

19 Claims, 7 Drawing Sheets

(56) References Cited

U.S. PATENT DOCUMENTS

2015/0111575 A1* 4/2015 Lei .................. H04W 36/08
455/436
2015/0139144 A1* 5/2015 Chai .................. H04W 28/08
370/329

FOREIGN PATENT DOCUMENTS

WO    WO 2013/142361 A1    9/2013
WO    WO 2014/000622 A1    1/2014

* cited by examiner

TRAFFIC STEERING AT HANDOVER

FIELD

The present application relates to handover and in particular but not exclusively to system which implement traffic steering at the time of handover.

BACKGROUND

A communication system is a facility which facilitates the communication between two or more entities such as user equipment (UE), network entities and other nodes. In the cellular systems a network entity in the form of a base station provides a node for communication with user equipment in one or more cells or sectors. It is noted that in certain systems a base station is called 'Node B'. Examples of cellular access system technologies include in order of their evolvement: GSM (Global System for Mobile) EDGE (Enhanced Data for GSM Evolution) Radio Access Networks (GERAN); Universal Terrestrial Radio Access Networks (UTRAN); and Evolved UTRAN (E-UTRAN).

Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

Due to the continuously growing traffic demand, mobile network operators (MNOs) are currently investigating ways of steering user traffic from the cellular to the WLAN network in order to boost the coverage and capacity of their systems. In traffic steering, some traffic may be offloaded from one network to another.

In the cellular network a user equipment (UE) may be handed over from one base station to another if it is determined that the other base station would provide better service for the user equipment (UE). This is often the case when the user equipment (UE) is moving from the coverage cell of a first base station to the coverage cell of a second base station. This handover becomes more complicated when traffic steering (such as the steering of traffic from the cellular to WLAN network) is in place.

It is the aim of the present application to take the offloading of traffic into account when carry out handover procedures.

SUMMARY

According to a first aspect, there is provided a method comprising: supporting a user equipment at a first access node; receiving by the first access node an indication of an offload status from a second access node; and making a determination relating to the handover of the user equipment from the first access node to the second access in dependence on the received indication.

The offload status may comprise an indication that the second access node is requesting that one or more user equipment, supported by the second access node, offload data traffic to a further network. The offload status may further comprise information corresponding to the offloading conditions of the second access node.

Making the determination may comprise: sending an offload request from the first access node to the user equipment. The offload request may comprise a request for the user equipment to offload data traffic to a further network in accordance with the offloading conditions of the second access node. The offloading conditions may comprise an indication of further networks to which data traffic may be offloaded. The offloading conditions may comprise an indication of the conditions of a cell supported by the second access node under which offloading should be carried out.

The indication of further networks to which data traffic may be offloaded may comprise a list of service set identifiers. The indication of the conditions of the cell comprises a minimum threshold value for at least one of: a reference signal received power; and a reference signal received quality.

The method may further comprise: receiving from the user equipment a response to the offload request; and initiating a handover with the second access node. A handover may occur when the second access node supports the user equipment. The first access node may support a first set of resources for the user equipment and the user equipment may offload a subset of the first set of the resources, and the method may further comprise: receiving an indication from the user equipment of the subset of resources from which traffic data has been offloaded; and indicating the remaining resources of the first set of resources in a handover request to the second access node.

Making the determination may correspond to selecting the second access node for a handover of the user equipment from the first access node to the second access node.

According to a second aspect, there is provided a network access node comprising at least one processor and a memory, the at least one processor and memory configured to: support a user equipment; receive an indication of an offload status from a neighbouring network access node; and make a determination relating to the handover of the user equipment from the first access node to the second access in dependence on the received indication.

According to a third aspect, there is provided a method comprising: receiving from a first access node a request to perform offload in accordance with offloading conditions of a second access node; and performing offloading in accordance with the conditions.

According to a fourth aspect, there is provided a user equipment comprising at least one processor and memory, the at least one processor and memory configured to: receive from a first access node a request to perform offload in accordance with offloading conditions of a second access node; and perform offloading in accordance with the conditions.

According to a fifth aspect, there is provided a method comprising: determining that an offload status of a first access node has changed; and sending an indication of the changed offload status to a second access node.

According to a sixth aspect, there is provided a network access node comprising at least one processor and a memory, the at least one processor and memory configured to: determine that an offload status of the network access node has changed; and send an indication of the changed offload status to a second network access node.

According to a seventh aspect, there is provided a system comprising: a user equipment supported by a first access node; a second access node configured to send an indication of an offload status of the second access node to the first access node; and the first access node configured to receive the indication of the offload status and to make a determination relating to the handover of the user equipment from the first access node to the second access node in dependence on the received indication.

The offload status may comprise an indication that the second access node is requesting that one or more user equipment, supported by the second access node offload data traffic to a further network. The offload status may further comprise information corresponding to the offloading conditions of the second access node.

The first access node may be configured to send an offload request from the first access node to the user equipment. The offload request may comprise a request for the user equipment to offload data traffic to a further network in accordance with the offloading conditions of the second access node. The first access node may be further configured to receive from the user equipment a response to the offload request and initiate a handover with the second access node.

The first access point may be configured to support a first set of resources comprising a first subset of resources and a second subset of resources wherein the second subset of resources may be offloaded by the user equipment and the first access point may be configured to initiate a handover of the first subset of resources to the second access point.

The second access point may be configured to send an indication of the first subset of resources to the further network element. The further network element may be configured to determine which resources have been offloaded by comparing the received indication of the first subset of resources to the first set of resources.

BRIEF DESCRIPTION OF DRAWINGS

Embodiments of the present application will now be described with reference to the following figures in which.

DETAILED DESCRIPTION

Figure 1:
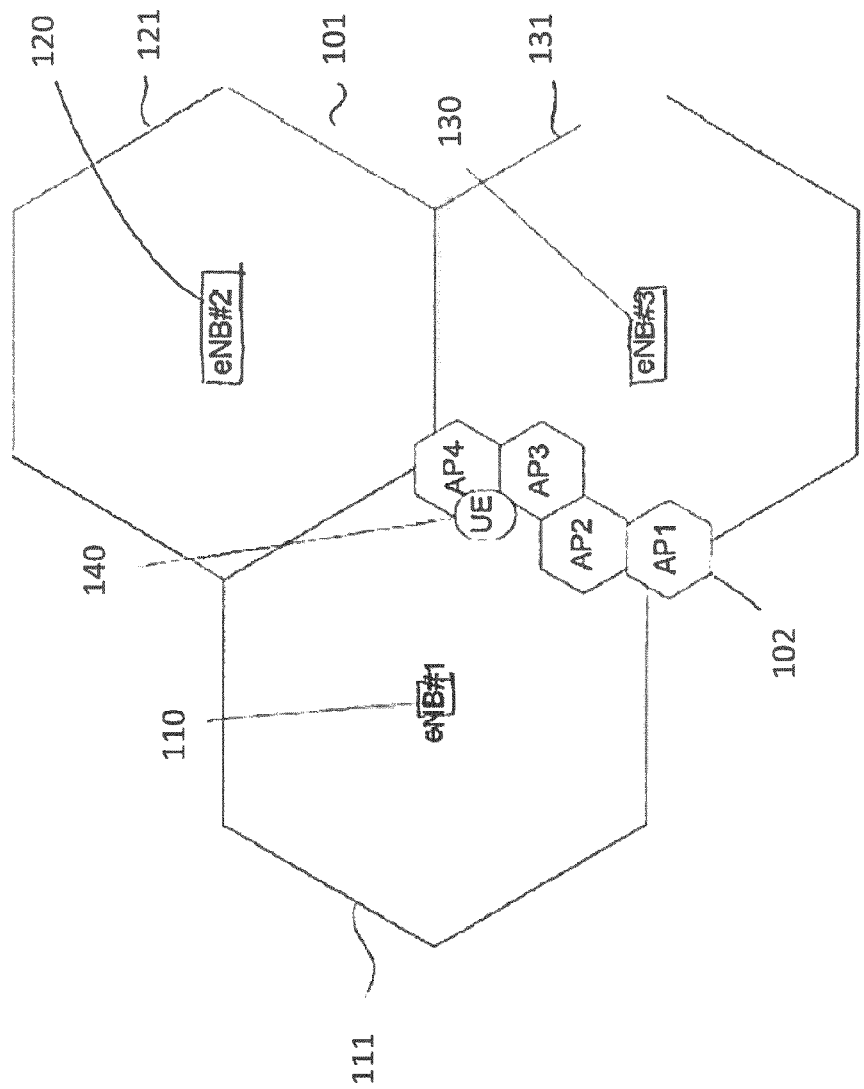
FIG. 1 shows an example of a telecommunications system in which embodiments may be implemented.

FIG. 1 shows and example of a communication system in which embodiments may be implemented.

FIG. 1 shows a communication system comprising a cellular network 101 as well as one or more wireless large area network (WLAN) cells 102. The cellular network 101 may comprise a first base station 110 serving a first cell 111, a second base station 120 serving a second cell 121 and a third base station 130 serving a third cell 131. It will be appreciated that the UE 140 and base stations 110, 120 and 130 may form part of a radio access network (RAN) of the cellular system.

In this example the cellular network is a long term evolution (LTE) cellular network and the base stations are enhanced node Bs (eNB). It will however be appreciated that in other examples, the cellular network may operate in accordance with other standards of wireless communication.

FIG. 1 further shows an user equipment (UE) 140. UE 140 is located in the first cell 111, but is close to the border between the first cell and the second cell 131. While the UE 140 is in the first cell 111, it may be being served by the first base station 110, however the proximity of UE 140 to the third cell 131 means that the UE 140 may be able to pick up signals from the third base station 130.

The UE 140 may be handed over from the first base station 111 to a neighbouring base station, for example the second base station 120 or third base station 130 depending on measurements of the second 120 and third 130 base stations made by the UE. This is to ensure that coverage for the UE 140 remains as high quality as possible in the event that the UE 140 moves and/or traffic supported by the cellular network 101 increases and/or decreases.

The base station that is serving the UE 140 (in this case the first base station 110) is known as the source base station. The source base station may configure the UE 140 to send measurement reports to the source base station. The measurement reports may be generated periodically and/or may be sent in response to a request or event. For example, the UE may be configured to send a measurement report when a received signal strength drops below a threshold. In other words, the UE may generate the measurement report when it determines that handover would improve signal quality.

The measurement reports may indicate the signal strength measured at the UE 140 of the neighbouring base stations. The source base station 110 may determine that the UE 140 is a candidate for handover based on the measurement reports and may select a target base station to which the UE 140 should be handed over. The source base station can then initiate the handover by sending a handover request to the target base station which may then accept or refuse the request.

Figure 3:
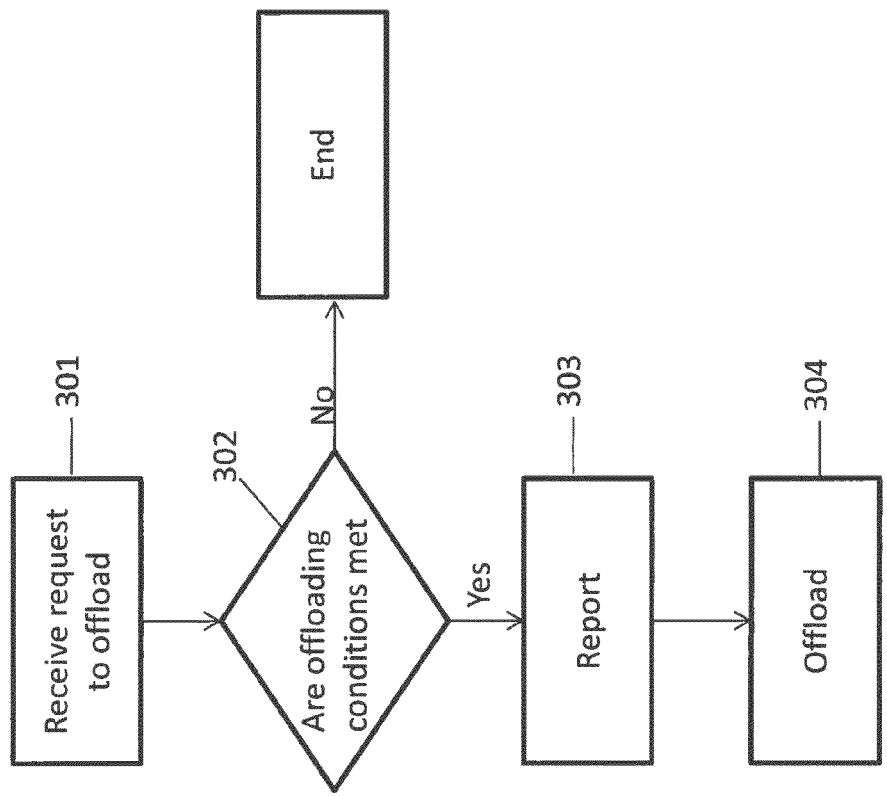
FIG. 3 is a flow diagram depicting the method steps that may be carried out by a user equipment in some embodiments.

The cellular system 101 of FIG. 1 may further support traffic steering or offloading some of the user traffic to a further network. In the example of FIG. 3, one or more wireless local area network (WLAN) cells 102 AP1, AP2, AP3 and AP4 are shown. These cells may for example be supported by WLAN nodes and may be deployed to extend the coverage of the cellular network in some cases. It will be appreciated that while the further network is described as being a WLAN network, other types of wireless networks may be implemented.

By offloading some of the UE 140 traffic to a further network, the first base station 110 may be able to reduce its load and/or provide a better service. In some cases, the first base station 110 may be able to additionally support further UEs that may not be able to offload traffic due to the capacity freed up from the offloading.

The UE 140 may offload traffic to a further network on receipt of an indication from the cellular network 101 (for example via the serving base station 110) of which network to pick (for example, the cellular network, for example 3GPP or WLAN) and which traffic to move to the selected network. For example, the first base station 110 may send this information to the UE 140 in a so-called "offload indication". The "offload indication" may be for example broadcast to the UE for example or provided in dedicated signaling.

The "offload Indication" may, for example, come in the form of a flag or be derived from further radio access network (RAN) assistance parameter settings that configure conditions to be fulfilled for the offloading and/or onloading of traffic. Here, offloading refers to moving traffic from the cellular network to a network other than the cellular network and onloading refers to moving traffic from the other network to the cellular network.

For example, the "offload indication" may indicate that offload to any of the WLAN APs forming network 102, is desired under a first set of conditions. If the UE 140 determines that the first set of offload conditions are fulfilled, the UE 140 will try to move traffic to a WLAN AP 102. If the "offload Indication" indicates that a 3GPP onload is preferred under a second set of conditions, when the second set of conditions are fulfilled the UE 140 will bring traffic back to the 3GPP network if this traffic was using WLAN APs 102.

In handover, the source base station may not be aware of the offloading requirements or preference of a target base station. In a handover request, a target base station may be selected to hand a UE over to, however the handover request may be refused because the target base station may be in an overload situation and may be requesting offloading to further networks for the UEs it already serves.

For example, consider that the second base station 120 has been selected by the source base station 110 as a target base station for UE 140. The source base station 110 would have made this determination based on measurement reports from UE 140 and does not have access to any information relating to the offloading preferences of the target base station 130.

The source base station 110 may then initiate hand over of the UE 140 to the target base station 130 by sending a handover request to the target base station. The target base station 130 can consider its offloading preferences in deciding whether to accept or reject the handover request. Thus the offloading preferences of the target base station 130 is only considered once hand over has already been initiated. If the target base station 130 is already requesting service offloading (indicated by its "offload indication") it may decide not to accept the new UE 140 as it finds itself in a high load situation and is already taking measures to reduce its load. In this case, the target base station 130 would reject the hand over request by sending a handover failure message to the source base station. This message may include a cause value why the request was not acknowledged.

Even for example, if the target base station 130 decides to accept the hand over while it is offloading currently served users to WLAN, the handed over UE 140 may be immediately asked to start offloading to WLAN after handover is complete. If the target base station 130 has a current "offload Indication" indicating that onload is preferred (for example that the cellular network will handle all the traffic and previously offload traffic is be returned to the cellular network from the further network) or is sending no indication at all, the handover procedure may continue as described by the standard.

Upon receiving a handover failure message from the target base station 130, the source base station 110 would then have to pick another target base station 120 from the measurement report list provided by the UE 140 and repeat the procedure until the UE 140 is accepted by a cell. If the list of target base stations is exhausted and no cell has accepted the UE 140, the source base station 110 will wait for a new measurement report from the UE 140 and repeat handover requests.

It can be seen that such separate handling of handover and offload may lead to inefficient usage of resources and an increase in a time taken to perform handover, which in turn can lead to radio link failures.

Some embodiment of the present application aim to make a handover decision while taking into account the offload preferences of potential target base stations. Some embodiments aim to allow the UE to perform offloading to a further network as part of the handover procedure. Some embodiments may be implemented in a case where the further network is deployed at the cell edge for coverage extension as shown by example in the FIG. 1.

In embodiments of the present application, the source base station receives information from one or more of its neighbouring base station. This information includes an offload indication which indicates if the base station sending the information is currently offloading. Optionally the information may also include assistance information, for example a set of RAN assistance parameters, that indicate the conditions to be fulfilled for the offload/onload of traffic.

The source base station may then select a target base station in dependence on the measurement report. It will be appreciated that in some embodiments, the selection may also be based on offload indications of the base stations identified by the measurement report.

In some embodiments, the source base station may select a target base station and request the candidate UE to offload traffic in accordance with the received offload indication and assistance information prior to the source base station sending a handover request. In this case, the candidate UE may already comply with the target base stations offloading preferences before being handed over to the target base station.

Figure 2:
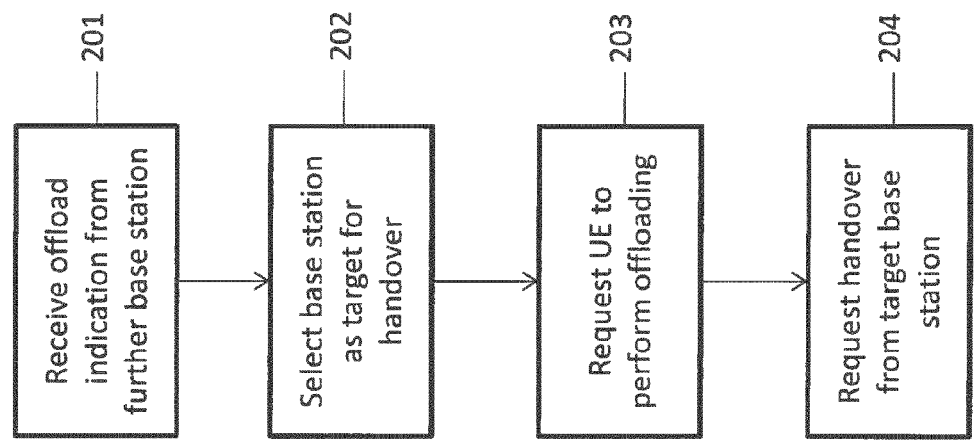
FIG. 2 is a flow diagram depicting the method steps that may be carried out by a source node in some embodiments.

FIG. 2 shows an example of the method steps that may be carried out by the source base station in accordance with some embodiments.

At step 201 of FIG. 2, a source base station may receive an offload indication from a neighbouring base station. It will be appreciated that the source base station may receive one or more offload indication(s) from one or more respective neighbouring base station(s). The offload indication may be in the form of a base station configuration update received via the standard interface (for example the X2 interface in case of LTE) between the neighbouring base stations. In one embodiment, the offload indication may include an indication of whether or not the respective neighbouring base station is implementing offloading, onloading and/or neither.

In a further embodiment, the source base station may additionally receive assistance information which may indicate the conditions under which the neighbouring base station will implement offloading. For example these assistance parameters may comprise information indicating signal quality thresholds. If a signal quality falls below a threshold, traffic offloading may be triggered in an attempt to preserve the signal quality for the users. An example of such a radio access network (RAN) assistance parameter may be a threshold for reference signal receive power (RSRP) and/or a reference signal received quality (RSRQ). These thresholds may indicate for example that for UEs measuring a reference signal below this threshold, offloading is requested. It will be appreciated that this offloading may also be dependent on whether the UE is in the coverage area of a WLAN APs 102.

At step 202 of FIG. 2, the source base station may select a target base station for handover of a UE. The target base station may be selected from a list of candidate base stations for handover. These candidate base stations may be identified from a measurement report generated by the UE and indicating measurements from the candidate base stations. The target base station may be also selected based on the offload indication associated with that base station.

In some embodiments, the source base station may choose to consider only target base stations that are not currently performing offloading. Offloading may indicate that a base station is already at high capacity and is attempting to reduce some of its load by offloading it. In other embodiments, the source base station may choose to handover to a base station that is offloading, but may request that a UE offloads according to the conditions of offloading for the target base station before the source base station sends a handover request. In this case, a newly handed over UE need not immediately start offloading as this was done before hand over.

If assistance information is received with the offload indication of the target base station, the source base station may request that the UE being handed over offload some or all of its traffic according to the offload conditions (assistance information) of the target base station. The source base station may provide the assistance information to the UE in a request to perform offloading at 203.

It will be appreciated that in some embodiments some of the conditions for offloading may be pre-configured at a UE. For example, the UE may be configured that if offloading is requested, to determine whether a received signal power and/or quality falls below a threshold. The UE may further determine whether a further network is available for offloading. In some examples UEs served by one or more cells in the same communication system (for example a primary network) may be configured to carry out these acts. The threshold to which a signal should be compared however may differ from cell to cell and whether offloading is to be carried out may also differ on a cell-wise basis. The value of the threshold and the indication of offloading may be sent to the UE in the request to perform offloading at 203.

In some embodiments, the UE may respond to the request to perform offloading at 203 by indicating that it is able to perform offloading.

The source base station may then send a hand over request to the target base station requesting hand over. This is shown at step 204 of FIG. 2.

FIG. 3 shows an example of the method steps that may be carried out by a UE in some embodiments. It will be appreciated that while not shown in the method diagram of FIG. 2, the UE may carry out measurements and generate measurement reports as used in handover procedures.

At step 301 of FIG. 3, the UE receives a request from the source base station to offload traffic to a further network. The request to offload may be to offload in accordance with the offloading conditions of a target base station for handover. The request to offload may include assistance information indicating the conditions under which the UE should offload.

At step 302, the UE determines whether or not the offloading conditions of the target base station are met. At this step, the UE may determine whether a signal falls below a threshold for offloading. For example the UE may compare a reference signal to a RSRP and/or RSRQ threshold to determine whether it is required to offload. It will be appreciated that the threshold will be the threshold of the target base station even though the threshold is signaled by the source base station. The UE may also determine whether a further network is available for offloading at this step.

If the conditions are met, the method may proceed to step 303 where the UE may generate a report message to the source base station. The report message may indicate to the source base station that the conditions for offloading are met and the UE will carry out offloading. At step 304, the UE offloads some traffic to a further network.

If the conditions for offloading are not met at step 302, for example if the UE is not in range of a suitable further network and/or a signal does not fall below a threshold, then the method may exit. In this example the UE may not generate a report at step 303 and may not carry out offloading at step 304. In some embodiments, the omission of the report message may indicate to the source base station that the UE is not performing offloading. The source base station may then continue the handover procedure. It will be appreciated that in this case that handover procedure may continue as though no indication of offloading was received.

At this point, the UE may be handed over to the target base station. It will be appreciated that further signaling may occur between the UE, source base station and target base station in accordance with the handover procedure to effectuate the handover.

Figure 4:
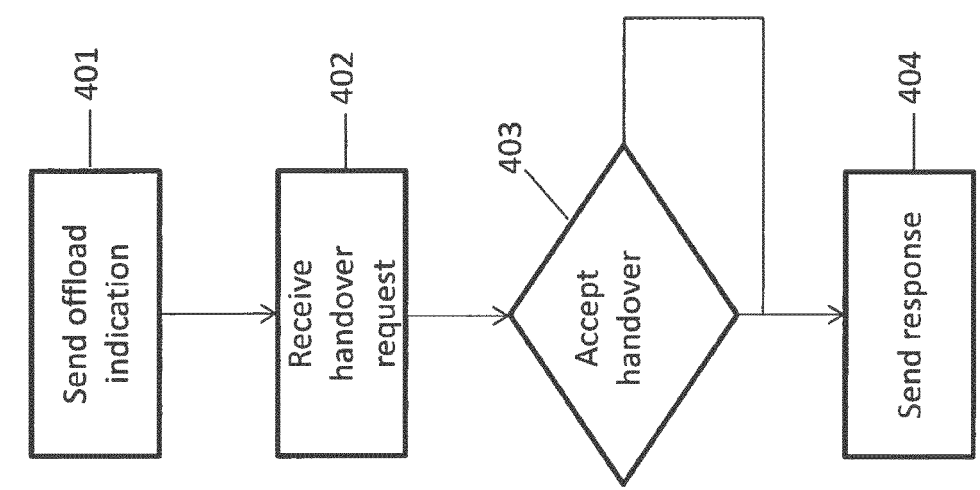
FIG. 4 is a flow diagram depicting the method steps that may be carried out by a target node in some embodiments.

FIG. 4 shows an example of the method steps that may be carried out by a target base station in accordance with embodiments.

At step 401 of FIG. 4, the target base station may provide an offload indication and optionally assistance information to a source base station. This information may be provided through a configuration update message for example an eNB Configuration Update.

At step 402, the target base station may receive a hand over request from a source base station. The source base station may identify the UE for handover in the request. In the case where the UE has performed offload in accordance with the target base station offload conditions before handover is requested, the handover request will include an indication that the UE has offloaded traffic to a further network in accordance with the target base station settings.

In one example, the source base station may indicate that the UE has performed offloading through the setting of a flag in the handover request message sent from the source base station to the target base station. For example a flag may be set to '1' to indicate the UE has moved traffic to the further network according to the offloading conditions of the target base station. The flag may be set to '0' to indicate that the UE was unable to and/or did not offload traffic to the further network.

At step 403, the target base station may determine whether or not to accept the handover. For example the target base station will determine if it has sufficient resources available to accept the UE. Whether the UE has carried out offloading or not may be taken into account by the target base station in deciding whether to accept the handover. For example the target base station may take the value of the flag into account when deciding on how to respond to the HO request.

The presence of a flag in the handover request message may in some embodiments, also allow the target base station to determine whether to request that the UE offloads data after handover has taken place. For example, the presence of the flag may indicate that offload has already been requested from the UE and the value of the flag may indicate the outcome of that request. The presence of the flag (with either value) may instruct the target base station not to try to offload the UE once HO (if accepted) is complete.

At step 404, the target base station sends a response message to the source base station and the method ends. It will be appreciated that further signaling may be carried out between the target base station, source base station and UE in accordance with handover procedure. For example, if the target base station accepts the handover, further signaling to complete the handover procedure may be carried out.

Some embodiments of the present application modify the handover procedure of a UE between a source and target node to incorporate the offload status or preference of the target node in the handover decisions. Some embodiments also allow a UE to offload in accordance with offloading conditions of a target node before being handed over to the target node.

Figure 5:
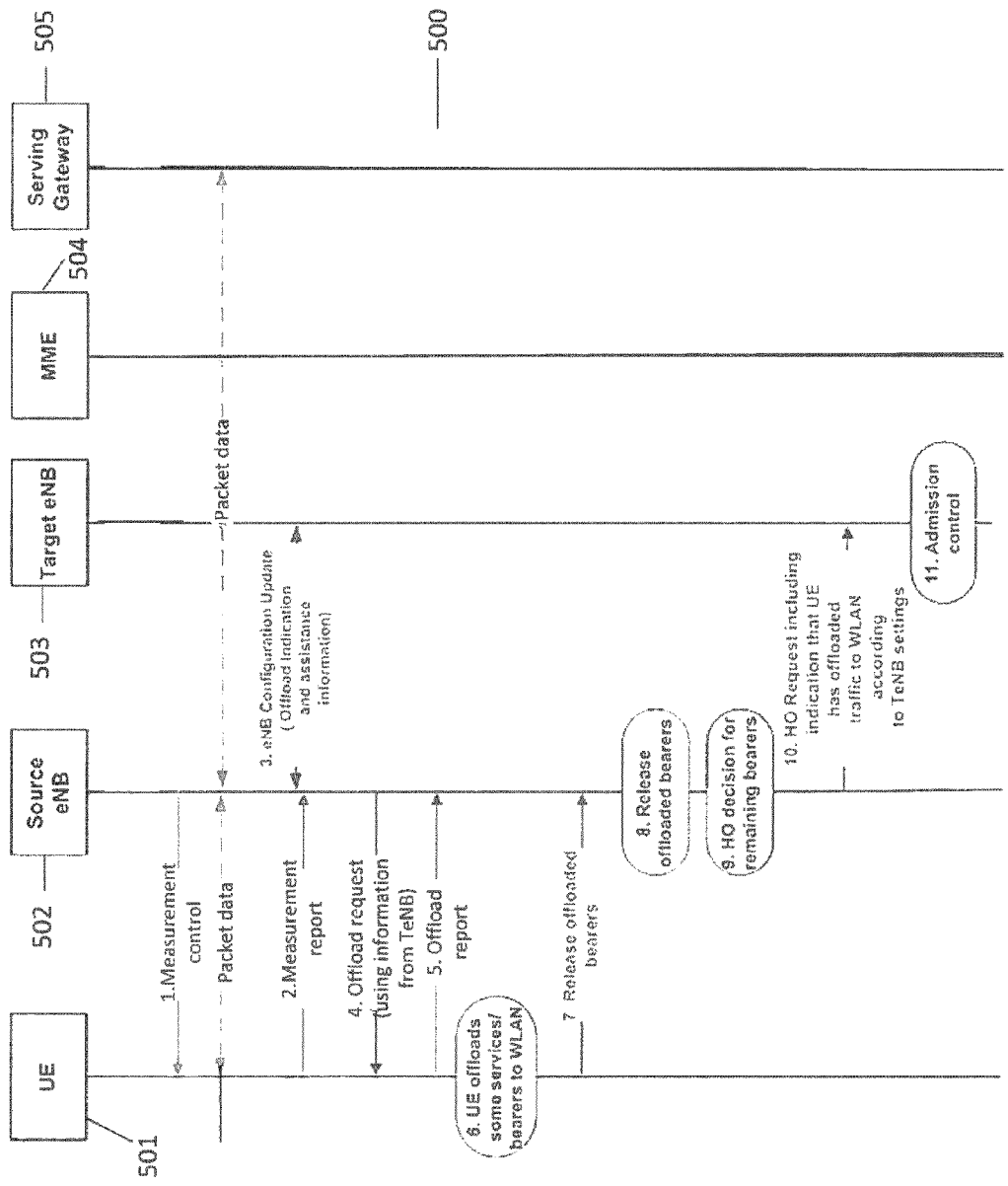
FIG. 5 is a message flow diagram depicting the message flow according to some embodiments.

FIG. 5 is a message flow diagram depicting the method of handover of a UE between a source and target node according to one embodiment. In this case, the UE is in an LTE communication system having a source eNB and a target eNB and offloading to a WLAN is enabled. The communication system also comprises further network entities such as a Mobility Management Entity (MME) and a Serving Gateway. It will be appreciated that these further network entities are provided to indicate the data communication of the UE and as such are not essential to the present embodiments.

FIG. 5 shows a UE 501, a source access node 502, a target access node 503, a mobility management entity (MME) 504 and a serving gateway 505. The source and target access nodes in this example are enhanced Node Bs (eNBs) and are called source and target in relation to a handover procedure that may be carried out between them. The MME 504 and serving gateway 505 are given as examples of further network nodes that may form part of the network. In the example of FIG. 5, the network 500 is a long term evolution (LTE) network.

At step 1 in the signaling flow, the source access node 502 sends a measurement control message to the UE 501. The measurement control message may configure or set parameters for the UE 501 to carry out measurements of neighbouring access nodes. For example the measurement control message 1 may configure the UE 501 to carry out the measurements under certain conditions such as a signal strength of the source access node 502 dropping below a threshold.

The UE 501 may carry out the measurements and generate a measurement report which is sent from the UE 501 to the source access node 502 at step 2. It will be appreciated that at this point, the UE 501 is being served by the source access node 501 and may communicate over the network 500. For example, the UE 501 may send and/or receive packet data via the source access node 502 shown at 510.

The source access node 502 may also receive one or more offload indication(s) from one or more neighbouring access node(s). The offload indications may for example be received periodically for example and/or the sending of the offload indication(s) from the neighbouring base station(s) may be triggered, for example by information to be including in the offload indication changing.

In the example of FIG. 5, the source access node 502 receives an offload indication 3 from the target access node 503. It will be appreciated that at this point, an access node for handover has not yet been selected by the source access node 502 and thus the target access node 503 is the access node that will be selected when a handover decision is made. While only the message 3 containing offload information is shown between the target access node 503 and source access node 502, it will be appreciated that two or more neighbouring access nodes may exchange this information through messages.

The offload indication may form part of an access node configuration update message 3, in this case an eNB Configuration Update. The offload indication may be an indication of whether or not a sending access node is implementing offloading. In other words, the offload indication is an indication of the offload status of an access node. In this example, the network offloaded to is a WLAN network and the offload indication indicates a WLAN offload status of an access node.

The offload indication may also be sent with assistance information. The assistance information may provide the conditions under which a UE 501 is expected to offload traffic to the further network and/or parameters for the selection of the further network. In this example the assistance information is a radio access network (RAN) assistance parameters for WLAN selection. These parameters may be for example one or more thresholds such as a reference signal received power (RSRP) threshold and/or a reference signal received quality (RSRQ) threshold and/or a list of service set identifiers (SSIDs) to be scanned. It will be appreciated that the SSIDs may identify WLANs.

The thresholds may indicate a value of a signal below which the UE is to attempt to offload traffic. For example the thresholds indicate a minimum signal quality that the call is attempting to maintain by offloading traffic.

In some examples, the offload information (comprising the offload indication and optionally the assistance information) may be sent when triggered by an event, for example when an element of the offload information changes its value. For example, the target access node 503 may send the offload information when it starts offloading traffic in its own cell.

On receipt of the offload information, the source access node 502 may be able to instruct the UE 501 to perform offloading to the further network on behalf of an overloaded target access node. The source access node 502 is capable of offloading the UE 501 directly on behalf of the target access node 503 using offload information of the target access node 503.

In order to facilitate this offloading, the source access node 502 may send the UE 501 a request to offload at step 4. The request to offload may comprise the offload information sent to the source access node 502 from the target access node 503. In the example of FIG. 5, the request 4 may include an indication to offload and information corresponding to the assistance information. It will be appreciated that the offload request 4 may be similar to an offload request made by an access node to a UE it is serving, in embodiments however, the offload request is made by one access node on behalf of a second access node. The request to offload sent from a first (for example a source) access node will be a request to offload in accordance with the conditions of a second (for example a target) access node. In this example, the offload request 4 is made by a source access node 502 on behalf of an access node to which it is handing the UE over.

It will be appreciated that in some embodiments the request to offload may not comprise an explicit request, but may comprise the offload information and this triggers the UE to attempt to offload in accordance with the offload information.

The information sent in step 4 may trigger an offload related event at the UE. The event may be for example a configurable event that is triggered by information received in broadcast or dedicated signaling from a source access node. The event may be configured by default for all UEs.

In response to the request 4, the UE 501 may generate a report and send this to the source access node 502 at step 5. The report 5 may be generated if certain conditions indicated in the assistance information are fulfilled. It will be appreciated that the assistance information relates to the target access node 503 and cell rather than the serving access node 502 and cell. For example the conditions may be that the RSRP of the target access node is less than a threshold and that the UE can 'see' a WLAN (for example given by the SSID list). In this case the RAN assistance parameters received by the UE correspond to the target access nodes conditions for offload. This measurement report may for example only be generated if the UE senses the availability of an appropriate further network.

When the UE 501 receives the request 4 triggering offloading, the UE may start scanning for a further network to offload to. For example the UE 501 may start scanning for a further network identified in the information in the request. The received values in the request 4 may also override any previous similar assistance information the UE 501 may have received from the source access node 502.

If the UE 501 fulfills the conditions included in the request 4, the UE 501 may generate the report and send it to the source access node at step 5. In some examples, if the conditions are not fulfilled, no report will be generated by the UE 501. In some embodiments, if no such report is received by the source access node 502 within a given time frame, the source access node 502 may continue with classic handover procedure.

It will be appreciated that the messages 4 and 5 of FIG. 5 may be similar to the case where a source base station is requesting that a UE it serves offloads traffic. In the case of a source base station making a request (i.e. not in a handover situation) the source base station will include information in the message 4 relating to the offload conditions of the serving cell. In the example of FIG. 5, the source base station includes information relating to the offload conditions of a target base station rather than itself.

An example of messaging sent to a UE by a serving access node to trigger offloading in accordance with offloading conditions of the serving access node and subsequent report is described in PCT/EP2014/051771 which is incorporated by reference herein.

The UE 501 may then perform offloading in accordance with the information and/or conditions included in the request 4. For example the UE 501 may associate with a found WLAN and offload some of its services/bearers at step 6. It will be appreciated that the UE 501 may offload some or all of its traffic to the further network.

The following examples of offloading cases:
a. The UE 501 offloads at least one service running over at least one of the UE's bearers for a public data network (PDN)
b. The UE offloads all services running over at least one of the UE's bearers for a PDN
c. The UE offloads all services on all the UE's bearers for a PDN
d. The UE offloads all services for all the UE's PDNs At step 7, the UE 501 may inform the source access node 502 about which bearers have been offloaded to the further network. The source access node 502 may release these bearers at step 8.

In step 9, the source access node 502 may attempt to initiate a handover for the remaining bearers or resources it is still supporting for the UE.

The source access node 502 may send a handover request (HO REQUEST) to the target access node 503 at step 10. The handover request may comprise an indication that the UE 501 has offloaded traffic to a further network following the target access node's 503 offload conditions. The indication may be for example a flag, for example the flag indicating that offload has occurred '1' or has not '0'". This indication may for example be used by the target access node 503 to give a priority to the UE 501 over other requesting UEs that plan to move all their traffic to the target cell. At step 11, the target access node may make a decision of how to respond to the handover request at step 10. The target access node may for example accept or reject the handover request 10.

It will be appreciated that on receipt of a measurement report 2 and offload indication 3, the source access node 502 will select one of the neighbouring access nodes as the target access node. The source access node may either additionally send the UE information 4 triggering it to attempt to offload traffic in accordance with the target access node offload conditions before initiating handover or carry out a handover without such a request 4. The decision of what type of handover to carry out may for example be made in dependence on the value of the offload indication 3.

Referring to step 7, it will be appreciated that informing the network as early as possible about what services (case a.), bearers (case b.) or even the UE's connection (case c.) were offloaded by the UE, may allow the network release the offloaded bearers more efficiently and use them for other UE connections.

In this request, the UE 501 could use the Non Access Stratum (NAS) messages "UE requested bearer resource modification procedure" or the "UE requested PDN disconnect procedure" to adjust the Traffic Flow Templates (TFTs) or to release bearers or the UE connection by the core network. This may lead to the release of radio bearers or even the disconnection or the UE from the network.

However, these messages are not well suited to handover procedure of embodiments because these are time consuming as they require communication with the core network. Due to the time taken, the UE may experience a radio link failure (RLF) before the handover can be initiated by the network while adjusting and/or releasing offloaded resources from the network 500 is yet not completed.

Except for the offloading case a), informing the network about offloading (for example at step 7) may be achieved by using an offload radio resource control (RRC) message. The offload RRC message may inform the source access node 502 about the offloaded radio bearers, for example by providing a list of bearer identities of the bearers that have been offloaded by the UE. After receiving this message, the source access node 502 may release the indicated bearers and will know what resources are not needed at the target cell served by the target access node 503. The source access node 502 may then reduce the resource requirements for the handover procedure with the target access node 503 accordingly. During or after the handover, the target access node 503 may provide information to the core network about the released (or not "handed-over") radio bearers.

In embodiments, the UE may send a message to the source access node indicating which resources have been made available through offloading. The source access node may send a handover request message to the target access node, indicating which resources are being handed over. The handover request will omit the resources previously used by the UE but offloaded by the UE prior to making the handover request.

The handover request to the target access node will only identify the resources that the target node is expected to provide for the UE and not the resources that were previously offloaded to a further network in accordance with the conditions of the target network. It will be appreciated that at this point, the resources that were offloaded by the UE may not be fully released as the core network (for example the MME 504 and serving gateway 505) has not yet been informed of the offloading.

The target base station may then inform the core network of what resources were handed over to the target base station for the UE. The target base station may inform the core network of this either during or after the handover procedure. The core network may implicitly determine which resources were handed over by determining which resources are missing from the resources handed over to target base station in comparison to the resources that were supported by the source base station for the UE. The core network may then release these offloaded resources.

Figure 6:
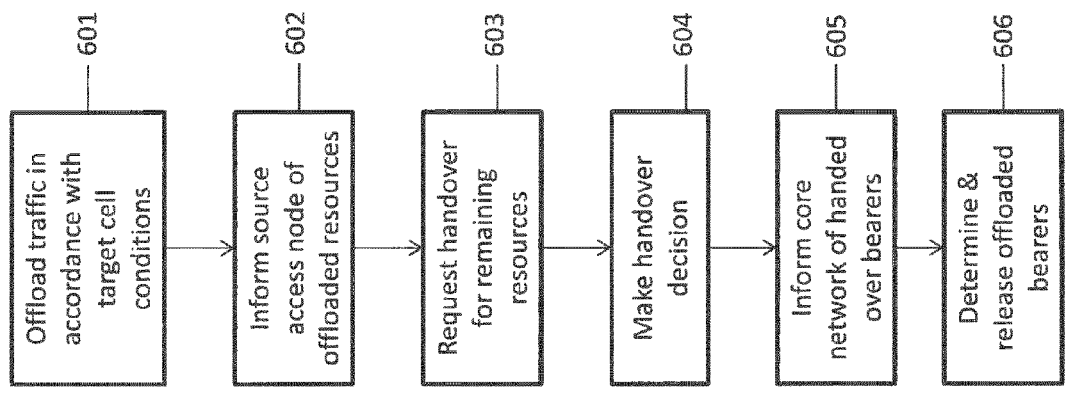
FIG. 6 is a flow diagram depicting the method steps that may be carried out by a communication system in accordance with a further embodiment.

FIG. 6 shows and example of the method steps carried out by the UE, source access node and target access node in informing the core network that resources have been released.

At step 601, the UE may carry out offloading in accordance with the offloading conditions of a target cell in response to a offload request 4. The UE may inform a source access node of the offloaded resources at step 602, for example message 7 of FIG. 5.

The source access node may send a handover request to a target access node at step 603. The handover request may include an indication of the resources that the UE requires. These resources will be the resources that had been supported at the source access node but omit the resources that were offloaded to a further network at step 601.

The target access node may make a handover decision in response to the handover request. The decision may be based on whether the target access node can support the resources identified in the handover request. In this case, the target access node may accept the handover. At step 605, the target access node may inform the core network of the resources that the target access node is now supporting for the UE. It will be appreciated that step 605 may be carried out during or after the handover procedure. The resources may be for example radio bearers.

At step 606, the core network may implicitly determine the resources that were offloaded by the UE prior to the handover request being sent at 603. The core network may determine which resources were supported by the source access node and are no longer supported at the target access node. These determined resources may be released by the core network.

Figure 7:
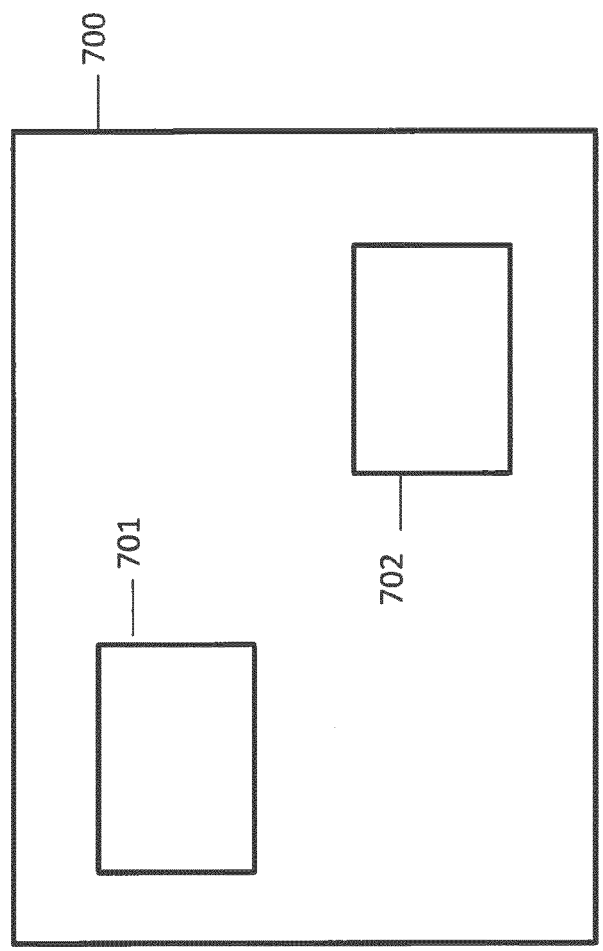
FIG. 7 is a schematic diagram showing an apparatus.

FIG. 7 shows an example of an apparatus 700 comprising a memory 701 and at least one processor 702. The memory 701 and at least one processor 702 may be configured to carry out any of the method steps as described above. The apparatus may be an access node or base station or may be a component forming part of such an access node or base station. In another embodiment, the apparatus may be a user equipment or part thereof and may be configured to carry out the method steps described in relation to the user equipment.

It is noted herein that while the above describes exemplifying embodiments of the invention, there are several variations and modifications which may be made to the disclosed solution without departing from the scope of the present invention.

It will be appreciated that while the foregoing uses the term base station, it will be appreciated that the base station may be a network node to provide access for a user equipment to a network. The base station may be a node B, e Node B and/or a base transceiver station in some embodiments. Some embodiments have been described in relation to LTE in which case the base station will be an eNode B.

It will be appreciated that while the foregoing uses the term user equipment, it will be appreciated that the user equipment may be any communication device for accessing a network. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

The required data processing apparatus and functions of a base station apparatus, a communication device or user equipment and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

The applicant draws attention to the fact that the present invention may include any feature or combination of features disclosed herein either implicitly or explicitly or any generalisation thereof, without limitation to the scope of any definitions set out above. In addition to the modifications explicitly mentioned above, it will be evident to a person skilled in the art that various other modifications of the described embodiment may be made within the scope of the invention.

The invention claimed is:

1. A method comprising:
   supporting a user equipment at a first access node;
   receiving by the first access node an indication of an offload status from a second access node, wherein the indication of the offload status comprises an offloading condition under which the user equipment offloads traffic to a further network; and making a determination relating to the handover of the user equipment from the first access node to the second access in dependence on the received indication.

2. The method of claim 1, wherein the offload status comprises information corresponding to the offloading condition of the second access node.

3. The method of claim 1, wherein the offload status comprises the indication that the second access node is requesting that one or more other user equipment, supported by the second access node, offload data traffic to the further network.

4. The method of claim 3, wherein the offloading condition comprises a condition of a cell supported by the second access node under which offloading should be carried out.

5. The method of claim 1, wherein making the determination further comprises:
sending an offload request from the first access node to the user equipment.

6. The method of claim 5, wherein the offload request comprises a request for the user equipment to offload data traffic to the further network in accordance with the offloading condition of the second access node.

7. The method of claim 5, further comprising:
receiving from the user equipment a response to the offload request; and
initiating a handover with the second access node.

8. The method of claim 1, wherein the indication of the further networks to which data traffic may be offloaded comprises a list of service set identifiers.

9. The method of claim 1, wherein the indication includes a minimum threshold value for at least one of:
a reference signal received power; and
a reference signal received quality.

10. The method of claim 1, wherein the first access node supports a first set of resources for the user equipment and the user equipment offloads a subset of the first set of the resources, further comprising:
receiving another indication from the user equipment of the subset of resources from which traffic data has been offloaded; and
indicating the remaining resources of the first set of resources in a handover request to the second access node.

11. The method of claim 1, wherein the making of the determination corresponds to selecting the second access node for a handover of the user equipment from the first access node to the second access node.

12. A network access node comprising at least one processor and a memory, the at least one processor and memory configured to:

support a user equipment;
receive an indication of an offload status from a neighbouring network access node, wherein the indication of the offload status comprises an offloading condition under which the user equipment offloads traffic to a further network; and
make a determination relating to the handover of the user equipment from the first access node to the second access in dependence on the received indication.

13. The network access node of claim 12, wherein the offload status comprises information corresponding to the offloading condition of the second access node.

14. The network access node of claim 12, wherein the indication includes a minimum threshold value for at least one of:
a reference signal received power; and
a reference signal received quality.

15. The network access node of claim 12, wherein the making of the determination comprises:
sending an offload request from the first access node to the user equipment.

16. The network access node of claim 12, wherein the offloading condition comprises a condition of a cell supported by the second access node under which offloading should be carried out.

17. A method comprising:
receiving from a first access node a request to perform offload in accordance with an offloading condition of a second access node, wherein the offloading condition corresponds to a condition under which the user equipment offloads traffic to a further network; and
performing offloading in accordance with the offloading condition to the further network.

18. A user equipment comprising at least one processor and memory, the at least one processor and memory are configured to:
receive from a first access node a request to perform offload in accordance with offloading condition of a second access node, wherein the offloading condition corresponds to a condition under which the user equipment offloads traffic to a further network; and
perform offloading in accordance with the offloading condition to the further network.

19. The user equipment of claim 18, wherein the offload condition comprises information corresponding to the offloading condition of the second access node.

* * * * *